(12) United States Patent
Lee et al.

(10) Patent No.: US 12,465,561 B2
(45) Date of Patent: *Nov. 11, 2025

(54) SELF-TANNING COMPOSITIONS

(71) Applicant: ELC MANAGEMENT LLC, Melville, NY (US)

(72) Inventors: Wilson A. Lee, Hauppauge, NY (US); Jacklyn Dowling, Farmingville, NY (US)

(73) Assignee: ELC Management LLC, Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,858

(22) Filed: Nov. 21, 2018

(65) Prior Publication Data

US 2020/0155430 A1 May 21, 2020

(51) Int. Cl.
*A61K 8/35* (2006.01)
*A61K 8/81* (2006.01)
*A61Q 19/04* (2006.01)

(52) U.S. Cl.
CPC .............. *A61K 8/35* (2013.01); *A61K 8/8141* (2013.01); *A61K 8/8164* (2013.01); *A61Q 19/04* (2013.01); *A61K 2800/30* (2013.01); *A61K 2800/33* (2013.01)

(58) Field of Classification Search
None
See application file for complete search history.

(56) References Cited

U.S. PATENT DOCUMENTS

| | | | |
|---|---|---|---|
| 2,949,403 | A | 8/1960 | Andreadis et al. |
| 4,708,865 | A | 11/1987 | Turner |
| 6,171,605 | B1 | 1/2001 | Bevacqua et al. |
| 7,223,382 | B2 | 5/2007 | Sokolinsky et al. |
| 7,794,694 | B2 | 9/2010 | Giacomoni et al. |
| 2005/0053567 | A1* | 3/2005 | Liu ................... A61K 8/8152 424/70.16 |
| 2006/0257342 | A1 | 11/2006 | Mu et al. |
| 2008/0286217 | A1* | 11/2008 | Chaudhuri ............ A61P 17/00 424/59 |
| 2009/0208430 | A1* | 8/2009 | Polonka ............... A61K 8/416 424/59 |
| 2011/0073126 | A1* | 3/2011 | Mu ..................... A61K 8/8152 132/200 |
| 2017/0189296 | A1* | 7/2017 | SaNogueira ........... A61K 8/35 |

FOREIGN PATENT DOCUMENTS

| | | |
|---|---|---|
| KR | 10-2009-0114884 | 11/2009 |
| KR | 20090114884 | * 11/2009 |
| KR | 2016-0016980 | 2/2016 |

OTHER PUBLICATIONS

U.S. Appl. No. 15/632,903, filed Jun. 6, 2017, Lee.
PCT International Search Report; International Application No. PCT/US2019/062456; Completion Date: Mar. 12, 2020; Mailing Date: Mar. 13, 2020; 18.31.
PCT Written Opinion of the International Searching Authority; International Application No. PCT/US2019/062456; Completion Date: Mar. 12, 2020; Mailing Date: Mar. 13, 2020; 18.31.
Russian Search Report; Application No. 2021117709; Completion Date: Feb. 15, 2022; 18.31.
Supplementary European Search Report; EP Application No. 19886701.2; Completion Date: Dec. 14, 2021; 18.31.
Singapore Search Report from Singapore Application No. 11202105271P; Completion date: Jun. 29, 2022; 18.31.
Singapore Written Opinion from Singapore Application No. 11202105271P; Date: Jul. 1, 2022; 18.31.
China International Search Report from CN Application No. 201980076672.1; Date: Nov. 18, 2022; 18.31.

* cited by examiner

*Primary Examiner* — Danah Al-Awadi
(74) *Attorney, Agent, or Firm* — Peter Giancana

(57) ABSTRACT

The present invention relates to a cosmetic composition comprising DHA in combination with defined amounts of acrylates/VA copolymer and acrylates copolymer in a cosmetically acceptable base or delivery vehicle. When applied topically, these compositions have much less malodor that known DHA-containing products while providing a tan with even coloration that is more natural looking than many DHA-induced self-tans. Compositions according to the invention dry quickly after application to an anhydrous state, resist transfer through incidental contact, and exhibit long-wear. Compositions according to the invention are easily removed when scrubbed with water above a certain temperature, but not as easily removed with water below that temperature.

12 Claims, No Drawings

SELF-TANNING COMPOSITIONS

FIELD OF THE INVENTION

The invention relates to self-tanning cosmetic compositions. More specifically, the invention relates to topical compositions that comprise dihydroxyacetone (DHA) and a system that reduces the malodor that is usually associated with compositions that comprise DHA.

BACKGROUND OF THE INVENTION

Tanned skin is often considered a sign of physical health and social success. For some people, a skin tan may be achieved naturally by exposing one's skin to ultraviolet radiation. A tan generated by exposure to ultraviolet radiation (UV) is, however, undesirable because of the known adverse effects of prolonged exposure to such UV radiation. For other people, it may be case that their skin does not readily tan as a result of UV exposure. Therefore, topically applied self-tanning products were developed to provide an "artificial" tan without excessive exposure to UV radiation, and for people whose skin does not readily tan. These products typically employ the compound dihydroxyacetone (DHA), which interacts with the proteins on the skin to produce a brown color in the epidermis that approximates a sun-derived tan.

Topical compositions that comprise DHA for skin tanning were first disclosed in U.S. Pat. No. 2,949,403. In these compositions, noticeable skin coloration occurred within one or two hours, and continued to develop for up to twenty-four hours after application. The tan itself, might last from 4-6 days, and could not be removed with soap and water. The DHA could be suspended, for example, in an aqueous, aqueous-alcoholic, or oil-based cosmetic, such as a liquid, lotion, cream or ointment, at concentrations ranging from 0.05% to 90.0% by weight of the total composition. According to the reference, a quantity of acetone could be used to alter the feel of the composition. It was also reported that sunscreen agents in the compositions may be beneficial without adversely affecting the tanning activity of the DHA.

In the early days of self-tanners, certain characteristic problems were identified, which limited widespread consumer acceptance. These included an unnatural orange color that developed on some users; a blotchy, mottled appearance during the first 24 hours following application; and a mal-odor that may persist for up to twenty-four hours after application to the skin. The unpleasant odor apparently arises as a result of compounds generated on the skin upon application of a DHA product. Over time, these problems have been addressed in various ways with differing degrees of success. For example, fragrance oils that mask the odor may be incorporated into the product, but that is only effective to a point, and does not really address the root problem.

U.S. Pat. No. 4,708,865 discloses compositions that comprise DHA and a specific combination of natural dyes (logwood powder, cutch powder and walnut powder) in narrowly defined concentrations. The composition is reported to produce a warm, uniformly dark, natural appearing artificial tan, even on fair skin.

U.S. Pat. No. 6,171,605 discloses self-tanning compositions comprising an effective amount of DHA in combination with an effective amount of propolis extract or its active component, caffeic acid phenethyl ester. These self-tanning compositions are reported to produce a tan with enhanced coloration that is more natural looking.

U.S. Pat. No. 7,223,382 discloses cosmetic compositions that comprise DHA in combination with a mal-odor reducing effective amount of a rosemary extract, or active component thereof.

U.S. Pat. No. 7,794,694 discloses a topical composition for application to the skin that comprises DHA in combination with a liposome encapsulated ursolic acid, and a cosmetically acceptable carrier. The composition is reported to impart a natural looking tan to the treated skin more rapidly than previously known products.

Nevertheless, to date, no completely satisfactory solution to these problems is known, and there remains room for improved DHA compositions.

Co-pending application U.S. Ser. No. 15/632,903, filed Jun. 26, 2017 is herein incorporated by reference, in its entirety. U.S. Ser. No. 15/632,903 discloses single phase color cosmetic compositions that are flexible and resistant to water below a selected temperature, 43° C. for example. The compositions wear well, are smudge and flake resistant, as well as oil resistant, making them very suitable as high shine, long wear cosmetics. Compositions according to the invention comprise specific combinations of acrylates/VA copolymer and acrylates copolymer in a cosmetically acceptable base or delivery vehicle. Compositions according to the invention are hydrophilic and easily removed when scrubbed with water above a certain temperature, but not as easily removed with water below that temperature. The compositions are suitable for use on skin, hair and nails, particularly as eye shadow, eyeliner, lip products, tattoo products and mascara. However, the specific combinations of acrylates/VA copolymer and acrylates copolymer are not reported to reduce odor and improve skin tanning when used in DHA-containing products, something disclosed for the first time in the present application.

SUMMARY OF THE INVENTION

The present invention relates to a cosmetic composition comprising DHA in combination with defined amounts of acrylates/VA copolymer and acrylates copolymer in a cosmetically acceptable base or delivery vehicle. These compositions provide a tan with a more even coloration than many DHA-induced self-tans, while having much less of the odor associated with DHA-containing products. Compositions according to the invention dry quickly after application to an anhydrous state, resist transfer through incidental contact, and exhibit long-wear. Compositions according to the invention are easily removed when scrubbed with water above a certain temperature, but not as easily removed with water below that temperature.

DETAILED DESCRIPTION OF THE INVENTION

All amounts expressed as percentages are to be understood as percentages by weight of the final composition, unless otherwise specified.

Throughout the present specification, "film former" or the like refers to a polymer that forms a thin film on the surface of the substrate to which it is applied. Typically this will happen when a solvent that accompanies the film former has evaporated, or been absorbed into, and/or dissipated on the substrate.

"Transfer resistant" means that when a composition according to the invention has been deposited on the skin and allowed to dry or cure, the composition is not readily transferred, by incidental contact, to another material, such as clothing.

"Water resistant" means that when a composition according to the invention has been deposited on the skin and allowed to dry or cure, the composition does not dissolve or re-wet or absorb moisture, and is not otherwise adversely affected by the water.

By "single phase" it is intended that the composition is in a stable homogeneous form rather than in the form of a heterogeneous water-in-oil or oil-in-water emulsion.

"Comprising" and the like, mean that a list of elements may not be limited to those explicitly recited.

It has been unexpectedly discovered that the addition of defined amounts of acrylates/VA copolymer and acrylates copolymer to compositions containing DHA will prevent or reduce the typical malodor associated with the application of DHA compositions to the skin, while still imparting to the treated skin a natural looking tan. During the development of the tan, the tone of the treated skin is even, as opposed to mottled or blotchy. The compositions are single phase aqueous compositions. Nevertheless, upon drying on the skin, the compositions are resistant to water below a certain temperature, transfer resistant, and flexible.

Dihydroxyacetone

A main ingredient of compositions of the invention is dihydroxyacetone (DHA, a.k.a. glycerone). DHA is a triose (monosaccharide with three carbon atoms) and the simplest ketose. It is hygroscopic at room temperature, and highly soluble in water, alcohol, acetone, diethyl ether and toluene. DHA has the molecular formula $C_3H_6O_3$, and the following non-chiral structure:

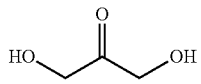

As a reducing sugar, DHA undergoes a Maillard Reaction with amino acids near the surface of the skin to produce pigments known as melanoidins. Different species of amino acid react differently to DHA, and this provides an overall range of coloration from yellow to brown.

Compositions of the invention must contain an amount of DHA that is effective to induce a noticeable color change in the surface of human skin. In compositions of the invention, concentrations of DHA, as a percentage by weight of the total composition, may range from 0.01% to 10%. For example, a preferred range is 1% to 7%, while 3% to 5% is more preferred.

Compositions of the invention also contain an amount of sugar, consistent with what is typical for DHA self-tan products. The usefulness of one or more sugars, such as fructose, glucose and sucrose, is well established in the art. Generally, sugars aid the color development process and reduce skin irritation. The amount of one or more of these may typically be from 0.5 to 5.0%, by total weight of the composition, but can be adjusted as needed.

Acrylates/VA Copolymer

A first main ingredient of the invention is acrylates/VA copolymer (INCI name), $C_{15}H_{26}O_4$, also known as ethenyl acetate; 2-ethylhexyl prop-2-enoate (IUPAC name); CAS number 25067-02-1. For detailed information, see PubChem Compound Database; CID=168269. In cosmetics, this material often functions as a binder, film former, adhesive and/or hair fixative. When deployed in aqueous cosmetic systems, acrylates/VA copolymer can impart a film on the skin or hair. The pure acrylates/VA copolymer film features a temperature dependence, such that a water rinse of about 40° C. or more will degrade the film, and allow it to be removed from a surface, while retaining its integrity at temperatures at or below normal skin temperature (i.e. 36.5-37.5° C.).

Compositions of the invention may comprise 0.05% to 30% of acrylates/VA copolymer by total weight of the composition, for example 3.5% to 28%, for example 7% to 14%, by total weight of the composition. At levels above about 30%, the resulting compositions are not commercially stable.

Acrylates/VA copolymer is commercially available, for example, as Vinysol 2140L from Daido Chemical Corp. Vinysol 2140L is a 46.6% aqueous mixture of acrylates/VA copolymer. Therefore, when using Vinysol 2140L, in order to achieve the concentrations of acrylates/VA copolymer noted above, the concentration of Vinysol 2140L should be about 0.1% to 65%, for example 7.5%-60%, for example 15-30%, by total weight of the composition. Vinysol 2140L is reported to have a pH of 4.5, a viscosity of 2,000 mPa-s, a calculated glass transition temperature (Tg) of −9° C., while the film exhibits a break elongation of 1,200%, and a break strength of 1.2 MPa (when spread to a thickness 0.1 mm). The strength of the material makes it suitable for spreading thinly applied topical compositions that require complete and even coverage over the area being treated. However, at the relatively high concentrations used in the present invention, prototype formulations were too rigid to be commercially useful. The task was to increase the spreadability of the composition to ensure even coverage, without jeopardizing formula stability, tanning activity of the DHA, transfer resistance and water resistance.

Acrylates Copolymer

To address the problem of high rigidity, we combined the acrylates/VA copolymer with an acrylates polymer that has a lower $T_g$ than acrylates/VA copolymer. In the present invention, a second main ingredient is acrylates copolymer, $C_{14}H_{22}O_6$, also known as ethyl prop-2-enoate; methyl 2-methylprop-2-enoate or 2-methylprop-2-enoic acid (IUPAC names); CAS number 25133-97-5. For detailed information, see PubChem Compound Database; CID=168299. In various types of cosmetic formulations, acrylates copolymer has a wide variety of uses including as film formers, hair fixatives, binders, and suspending agents, viscosity enhancers, antistatic agents and adhesives.

At concentrations discussed herein, the combination of acrylates/VA copolymer and acrylates copolymer have a dry time that is suitable for the cosmetics consumer, while the increase in tackiness was not so much as to be unreasonable for consumer use. Furthermore, as noted above, acrylates/VA copolymer films feature a temperature dependence, such that a water rinse of at least about 40° C. will degrade the film, but not below this. By combining acrylates/VA copolymer with acrylates copolymer at the ratios disclosed herein, the resulting films exhibit a different minimum temperature of water that is required to degrade the film. In general, the addition of acrylates copolymer tends to increase the minimum temperature of water that is required to degrade the film.

Compositions of the invention may comprise 0.15% to 3.25% of acrylates copolymer by total weight of the composition, for example 0.1875% to 3.0%, for example 0.75% to 1.5%, by total weight of the composition. Furthermore, in the present invention, the weight ratio of acrylates/VA copolymer to acrylates copolymer should be in the range of 10:1 to 30:1, preferably 15:1 to 25:1, even more preferably, about 20:1. Acrylates copolymer is commercially available, for example, as Daitosol 5000AD from Daito Kasei Kogyo Co. Daitosol 5000AD is a 50% aqueous mixture of acrylates copolymer. Therefore, when using Daitosol 5000AD, in order to achieve the concentrations of acrylates copolymer noted above, the concentration of Daitosol 5000AD should be about 0.30% to 6.5%, for example 0.375%-6.0%, for example 1.5-3.0%, by total weight of the composition, while maintaining a weight ratio of Vinysol 2140L to Daitosol 5000AD in the range of 10:1 to 30:1, preferably 15:1 to 25:1, even more preferably, about 20:1. Daitosol 5000AD is reported to have a pH of 5.5-7.5, a viscosity of 50-100 mPa-s, a glass transition temperature (Tg) of about −14° C.

Water Rinse

In the United States, typical water temperatures from a home faucet are set not to exceed 120° F. (48.9° C.). Therefore, the certain minimum temperature (below which compositions of the invention do not rinse off easily) should be set between 40° C. and 48.9° C., preferably from 42° C. to 46° C., more preferably from 43° C. to 44° C. In some embodiments, 43° C. to 44° may be preferred, because it is several degrees warmer than normal, healthy skin temperature (i.e. 36.5-37.5° C.), but not so high as to damage the skin or cause pain. Temperatures below 40° C. may be too close to normal skin temperature to provide a consistent experience in consumer use. By using acrylates/VA copolymer in combination with acrylates copolymer, in the ratios disclosed herein, the certain minimum temperature (below which compositions of the invention do not rinse off easily) can be adjusted to be more than 40° C., preferably 42° to 46° C. to provide more of a margin of error, or better 43° C. to 44° C.

Form of Composition and Other Ingredients

Preferred compositions of the invention are a single aqueous phase, and have no oil or silicone. Compositions of the invention will typically comprise from 40% to 65% of water by weight of the total composition. This amount of water is that from all sources, such as that in Vinysol 2140L and Daitosol 5000AD.

One advantageous feature of compositions of the present invention is that they are hydrophilic before and during use, but hydrophobic upon drying. This is an unusual dry state for a single phase aqueous composition. The ability to formulate in an aqueous, hydrophilic state that dries to a hydrophobic state (while having other beneficial properties described herein) is a great advantage of the present invention. While the composition is in a first or hydrophilic state, the ability to formulate with water soluble ingredients is enhanced, and application of the cosmetic is easier and feels nicer. When dried to a second or hydrophobic state, the applied composition resists breakdown from moisture in the skin and atmosphere.

It may be noted that Vinysol 2140L (acrylates/VA copolymer) has this property of being hydrophilic in a first state and drying to become hydrophobic in a second state. However, it was not a foregone conclusion that the final aqueous compositions would retain this property, nor was it a trivial task to achieve this property in the final composition. At a minimum, we developed aqueous compositions that dry to a hydrophobic state, while also delivering a transfer resistant self-tanning product that maintains an even tone while the tan develops, with reduced odor.

To achieve sufficient hydrophilicity in the first state, the use of hydrophobic materials should be limited to less than about 0.5% based on total weight of the composition; preferably less than 0.25%. Materials that are partly hydrophilic and partly hydrophobic could possibly exceed this limits, based on the performance of the final composition. In some embodiments of the invention, it is preferable if the composition comprises no hydrophobic ingredients, such as hydrophobic oils or waxes. Oils are organic substances that are liquid at ambient temperature, such as esters, triglycerides, hydrocarbons and silicones. A typical wax used in cosmetic compositions is carnauba wax. In some embodiments of the invention, it is most preferable if the compositions contain no hydrophobic oils or waxes. Nevertheless, upon drying to a film, the film clearly exhibits hydrophobicity, making it resistant to water. However, the dried compositions of the present invention may be easily washed off with water at or above that certain minimum temperature and an application of shear. Both shear and a certain minimum water temperature are needed to remove the composition from the skin or hair. For example, when the dried composition is exposed to water at or above a certain minimum temperature, the composition experiences a breakdown in structure, but does not otherwise dissolve in the applied water, so that the composition remains on the skin. Likewise, when the dried composition is exposed to shear (in the form of a typical vigorous scrubbing action), without water or with water below a certain minimum temperature, the composition remains in place, having excellent adhesion to the skin. To effect the removal of the composition from the skin, both shear (in the form of a typical vigorous scrubbing action) and water above a certain minimum temperature must be applied to the composition in order to lift it off of the skin. This means that compositions of the invention have excellent transfer resistance. That the tanning product remains in place, contributes to a better, more even tan.

Various ingredients may be included in the cosmetic compositions to fine tune the consumer experience or enhance the performance of the composition. Alcohols, for example, may be useful to speed up drying after application to the skin. Amounts of alcohol up to 5% may be useful. The cosmetic compositions may also comprise preservatives as needed, typically up to about 2% by weight of the composition. Also, thickeners, viscosity decreasing agents, and/or pH adjusters may be used as needed to create a consumer acceptable product, typically at levels of less than 1% by weight of the composition. At these levels, the foregoing named ingredients do not seem to adversely affect the cosmetic and commercial properties of the compositions.

Glycols, also known as diols (chemical compounds comprising two hydroxyl groups) are optional, but sometimes useful in the present invention. Glycols, such as 1,3-propanediol, might typically be used in cosmetics to enhance the freeze-thaw stability of the composition. However, when present glycols may also affect the certain minimum temperature below which the dried composition cannot be easily removed from the skin or hair. Where acrylates copolymer tends to increase the certain minimum temperature, glycols tend to decrease it. Therefore, the use of glycols should be avoided, or at least limited to no more than 4% of total glycols, preferably, less than 1% of total glycols, more preferably less than 0.5% of total glycols. Most preferred is 0% glycols, especially when acceptable freeze-thaw stability is achievable without glycols. Furthermore, preferred compositions of the invention comprise no other ingredient in an amount sufficient to plasticize the acrylates/VA copolymer. This is unlike U.S. Pat. No. 8,932,570 where water-soluble plasticizer, which may be glycol, must be present in the composition in an amount sufficient to plasticize.

Another main concern of the cosmetic composition is that it should avoid optical interference effects in the dried state.

That is one reason for providing single phase aqueous compositions, as emulsions tend to be cloudy or milky. Since emulsions are excluded, it is preferable for surfactants and emulsifiers to be avoided, or only present incidentally, in trace amounts. If present in the aqueous compositions of the invention, any material which demonstrates emulsifier or surfactant properties will have an HLB of less than 12. Therefore, based on total weight of the composition, it is preferable if the composition comprises no more than 3% of surfactants and/or emulsifiers, more preferably no surfactants or emulsifiers.

Further to avoiding optical interference effects in the dried film, it is preferable if the composition comprises no clay particles or undissolved particulate material of any kind at a level that would interfere with the shine of the dried cosmetic composition. At a minimum, the concentration of clay particles or undissolved particulate material must be limited to a level that does not prevent a desired level of shine in the dried film. Preferably, compositions of the invention comprise no more than 0.25% of clay particles or undissolved particulate material, more preferably no clay particles or undissolved particulate material.

Polyurethane tends to make compositions very rigid, and will alter the certain minimum temperature of water required for removal of the film from the skin or hair. Therefore, it is preferred if compositions of the invention comprise a total of no more than 0.5% of polyurethane. More preferably, compositions of the invention comprise a total of no more than 0.001% of polyurethane. Most preferably, compositions of the invention comprise no polyurethane.

Agents that significantly interfere with the structure of the dried film will alter the certain minimum temperature of water required for removal of the film from the skin or hair, as well degrade the shine or color. Therefore, it is preferred if compositions of the invention comprise a total of no more than 0.5% of structuring agents, such as Carbopol®, wax, clay (such as bentonite) or stearic acid. More preferably, compositions of the invention comprise a total of no more than 0.001% of structuring agents. Most preferably, compositions of the invention comprise no structuring agents. A useful exception to this rule is sodium stearate. Unlike many structuring agents, sodium stearate is partly hydrophilic, which makes it suitable for an aqueous system. Although sodium stearate is partly hydrophobic, its use has not appeared to compromise the objectives of the present invention. Sodium stearate may be as a structuring agent up to 4% by weight of the total composition, More than that amount will begin to disrupt the acrylic bond strength which translates less water resistance.

Solids that do not dissolve in the aqueous compositions of the present invention should also be minimized or avoided altogether, as they alter with the certain minimum temperature of water required for removal of the film from the skin or hair, as well degrade the shine.

Odor And Color Development

Upon application to a skin surface, compositions of the invention as disclosed herein, spread evenly to provide uniform coverage, and dry quickly to minimize consumer inconvenience. Apparently, the distribution of DHA within the transfer resistant polymer film is improving the color tone across the treated area by eliminating or reducing blotchiness. At the same time, the association of DHA with the polymer film eliminates or reduces the malodor that is usually associated with DHA self-tanning products. Furthermore, the applied compositions are waterproof, sweat proof and transfer resistant.

One embodiment of a composition according to the present invention (Working Example 1), as well as a control composition (Control Sample 1), were prepared as shown in Table 1. Amounts are weight percent of total composition. The control is the same as Working Example 1, except that, in the control, the acrylates/VA copolymer and acrylates copolymer are replaced with water. Both compositions comprise 5% DHA, which is near the upper limit of the amount of DHA typically used in self-tanning products. By testing with a high amount of DHA, we intend to show the unmistakable effects of the claimed compositions.

TABLE 1

| Ingredient | Working Example 1 | Control Sample 1 |
|---|---|---|
| water | 47.85 | 79.35 |
| dihydroxyacetone | 5.00 | 5.00 |
| glycerine | 4.50 | 4.50 |
| 1,3 butylene glycol | 4.00 | 4.00 |
| alcohol | 3.00 | 3.00 |
| fructose | 1.00 | 1.00 |
| glucose | 1.00 | 1.00 |
| sucrose | 1.00 | 1.00 |
| anti-microbial agent | 0.85 | 0.85 |
| xanthan gum | 0.30 | 0.30 |
| [1]Vinysol 2140L | 30.00 | — |
| [2]Daitosol 5000AD | 1.50 | — |

[1]46.6% aqueous mixture of acrylates/VA copolymer.
[2]50% aqueous mixture of acrylates copolymer.

Evaluation

An amount of the composition according to Working Example 1 was applied to the volar surface of one arm of a test subject. The same amount of Control Sample 1 was applied to the volar surface of the other arm of the same test subject. The products was evaluated for odor immediately after application, then two hours after application. Then the product was rinsed off with water above about 43° C. immediately after rinsing, the products were again evaluated for odor, and then again one hour later. This evaluation was made by ten different evaluators. The results are aggregated below.

| | More off odor than control | Same as Control | Less off odor than control |
|---|---|---|---|
| Initial after application | 5* | 2 | 2 |
| 2 hours after application | 3 | 5 | 2 |
| Initial after rinse off | 1 | 2 | 7 |
| 1 hour after rinse off | | 3 | 5 |

*a distinct "polymer" odor

It may be noted that in all five test evaluations where Working Example 1 displayed more off odor than the control, the description of the odor was "a polymer" odor, not the sour odor that is characteristic of topically applied DHA self-tanning products. Thus, Working Example 1 exhibits a significant improvement in the odor normally associated with DHA self-tanning products, both initially, and several hours following application.

Additional examples of embodiments of the invention include the Working Examples 2-5 shown in Table 2. Also shown, is an unstable composition that did not work (Non-working Example 6), because we could not solubilize the DHA, given the amount of acrylates/VA copolymer in the composition. By observation, it has been consistently noted that compositions of the invention provide a tan that is at least comparable to that of a conventional DHA self tanning product. Nevertheless, it is observed that during tan development, which may continue for up to 24 hours after application, the tone of the skin treated with a composition according to the present invention is significantly, noticeably more even and less blotchy than a conventional DHA self tanning product.

| Ingredient | Working Example 2 | Working Example 3 | Working Example 4 | Working Example 5 | Non-working Example 6 |
|---|---|---|---|---|---|
| water | 16.35 | 13.85 | 63.60 | 71.475 | 11.10 |
| dihydroxyacetone | 5.00 | 3.00 | 5.00 | 5.00 | 5.00 |
| glycerine | 4.50 | 4.50 | 4.50 | 4.50 | 4.50 |
| 1,3 butylene glycol | 4.00 | 4.00 | 4.00 | 4.00 | 4.00 |
| alcohol | 3.00 | 3.00 | 3.00 | 3.00 | 3.00 |
| fructose | 1.00 | 1.00 | 1.00 | 1.00 | 1.00 |
| glucose | 1.00 | 1.00 | 1.00 | 1.00 | 1.00 |
| sucrose | 1.00 | 1.00 | 1.00 | 1.00 | 1.00 |
| anti-microbial agent | 0.85 | 0.85 | 0.85 | 0.85 | 0.85 |
| xanthan gum | 0.30 | 0.30 | 0.30 | 0.30 | 0.30 |
| Mica/oxides | — | 4.50 | — | — | — |
| [1]Vinysol 2140L | 60.00 | 60.00 | 15.00 | 7.50 | 65.00 |
| [2]Daitosol 5000AD | 3.00 | 3.00 | 0.75 | 0.375 | 3.25 |

[1]46.6% aqueous mixture of acrylates/VA copolymer.
[2]50% aqueous mixture of acrylates copolymer.

We conclude that the combination of acrylates/VA copolymer and acrylates copolymer creates a film that significantly reduces the characteristic odor associated with DHA tanning products, while more evenly distributing the DHA tanning effect across the treated area. Without being able to say for certain, odor molecules seem to have difficulty diffusing through the polymer film, or may even be adsorbed onto the skin-side surface of the polymer film. At the same time, we suspect that the hydrophilic nature of the compositions that spreads very well and then dries hydrophobic seems to improve evenness of skin tone. Certainly, it is the unique properties of the combinations of acrylates/VA copolymer and acrylates copolymer as disclosed herein, that are particularly well suited to improve DHA tanning products.

While particular embodiments of the present invention have been described, it would be obvious to those skilled in the art that various other modifications can be made without departing from the spirit and scope of the invention. Therefore, all modifications that are within the scope of this invention are intended to be covered in the appended claims.

What we claim is:

1. A stable self-tanning, single phase, aqueous composition for topical application to the skin comprising, by total weight of the composition:
   0.01% to 10% of dihydroxyacetone;
   0.05% to 30% of acrylates/VA copolymer (acrylates/vinyl acetate copolymer);
   acrylates copolymer; and
   40% to 65% of water;
   wherein the ratio of acrylates/VA copolymer to acrylates copolymer is 10:1 to 30:1.

2. The composition of claim 1 wherein the ratio of acrylates/VA copolymer to acrylates copolymer is 15:1 to 25:1.

3. The composition of claim 1 wherein the ratio of acrylates/VA copolymer to acrylates copolymer is 20:1.

4. The composition of claim 1 having no hydrophobic oils or waxes.

5. The composition of claim 1 having no surfactants or emulsifiers.

6. The composition of claim 1 having no clay particles or undissolved particulate material.

7. The composition of claim 1 having no polyurethane.

8. The composition of claim 1 having less than 0.5% glycol.

9. The composition of claim 1 having no hydrophobic oils or waxes, no surfactants or emulsifiers, no clay particles or undissolved particulate material, and no polyurethane.

10. The composition of claim 1 having no glycol.

11. The composition of claim 1 wherein the concentration of acrylates/VA copolymer is 3.5% to 28% by total weight of the composition.

12. The composition of claim 11 wherein the concentration of acrylates/VA copolymer is 7% to 14% by total weight of the composition.

* * * * *